(No Model.)

C. Z. HUBBELL.
CAR COUPLING AND BUFFER.

No. 455,331. Patented July 7, 1891.

Witnesses,
A. Haupt Jr.
Charles E. Tetley

Inventor,
Clarence Z. Hubbell.
Attorney, Haupt Brothers

UNITED STATES PATENT OFFICE.

CLARENCE Z. HUBBELL, OF CHICAGO, ILLINOIS.

CAR COUPLING AND BUFFER.

SPECIFICATION forming part of Letters Patent No. 455,331, dated July 7, 1891.

Application filed December 1, 1890. Serial No. 373,252. (No model.)

*To all whom it may concern:*

Be it known that I, CLARENCE Z. HUBBELL, a citizen of the United States, residing in Chicago, in the county of Cook and State of Illinois, have invented a new and useful Improvement in Car Couplers and Buffers, of which the following is a specification.

My invention relates to car coupler and buffer in which a series of parallel draw-bars is attached to rotating angle-arms and a transverse yoke ties the opposite angle-arms together. At the same time the buffer-head and coupling-hooks act together with each other and with the angle-arms and yoke.

The object of my invention is to provide a means for securing an equality of action between two parallel reciprocating draw-bars and buffers, and I attain this object by means of the mechanism herein described, and illustrated in the accompanying drawings, in which—

Figure 1:
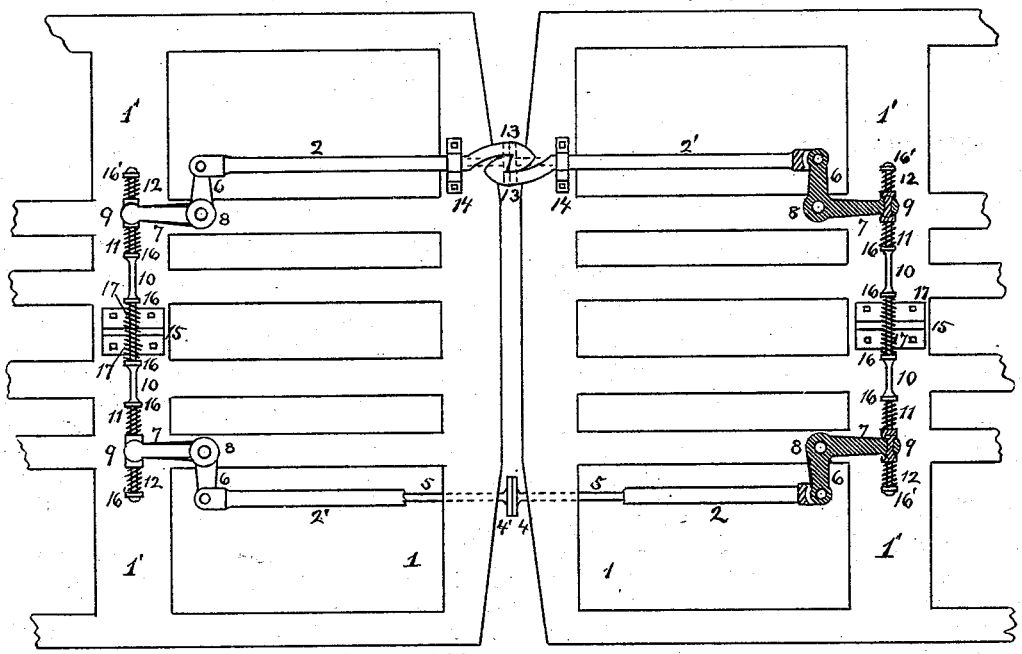
Figure 3:
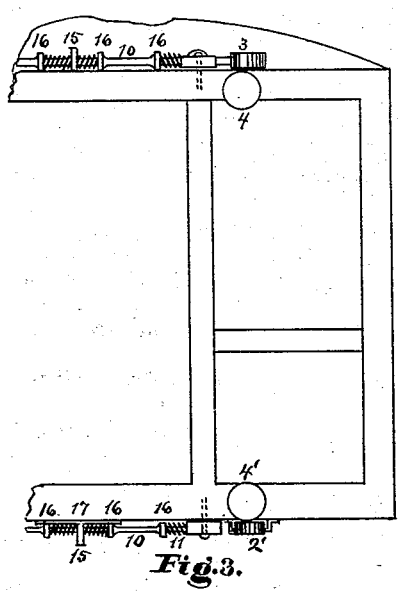
Figure 2:
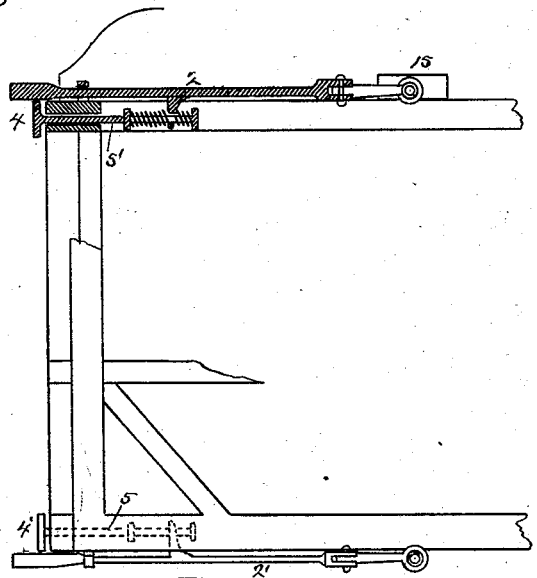

Figure 1 is a view of the under side of two cars in juxtaposition, showing the method of applying my device to a car. Fig. 2 is an elevation and vertical sectional view of one end of a car, showing my mechanism at top and bottom of the car. Fig. 3 is a one-half elevation view of the end of a car with my mechanism at top and bottom.

Similar letters and figures refer to similar parts throughout.

At a convenient point on the timbers 1' of a car 1 I make a T-piece 15, the hood or head piece of which is bolted to the timber 1'. In the flange is drilled a hole, and through this hole is passed the yoke 10. This yoke 10 is made of any desired length, and at convenient points on the yoke 10 are made collars 16 and 16'. The ends of the yoke 10 pass through ball-heads 9 on the ends of the angle-arm 8, in which ball-head 9 the yoke 10 is constructed to adapt itself to the socket in the ball-head 9, whereby free oscillating motion is allowed the yoke 10 in the ball-head 9. On the yoke 10, at convenient points, are placed spiral springs 11 12 17, which are controlled by the collars 16, and by the joint action of the said springs 11 12 17 the yoke 10 is kept at or near an equipoise. To the yoke 10, by proper device to allow of free play, the ball-head 9 connects the angle-arm 8. This angle-arm 8 is made of suitable metal, bent at right angles and pivoted in the angle to the timbers of the car. From the pivot radiate the arms 6 and 7. On the end of the arm 7 is the ball-head 9, described, and on the end of the arm 6 is pivoted the draw-bars 2 and 2', as the case may be. On the end of the draw-bar is a coupling-hook 13, held by a strap 14 to the car-timbers. At a suitable point on the draw-bar 2 2' is made a lug, and to the lug by suitable device is secured the buffer-rod 5 5' and the buffer-plate 4 4'.

Having thus described the parts of my invention, I now proceed to explain the manner of using the same. I put the parts all together, as indicated, so that the yoke 10 will be held centrally by the T-piece 15, and the springs 11, 12, and 17 will keep the yoke 10 in a uniform relation with the other parts. The ends of the yoke 10 play in the ball-heads 9, and the angle-arm 8 transmits motion from the draw-bars 2 or 2' through the yoke 10 to the other draw-bar 2 or 2', as the case may be. When two cars are coupled together, the hooks 13 engage and the buffer-plates 4 4' are brought together, and when the cars are run on a straight track the yoke 10 is at right angles relative to the draw-bars 2 2'. When the cars run on curved track, the inner draw-bars are compressed longitudinally and the outer ones elongated, thereby securing by means of the yoke 10 an equal draft, as is apparent.

Being aware that couplers and buffers are not a new invention, as such I do not lay claim to the broad principal of "coupler and buffer;" but What I do claim, and desire to secure by Letters Patent, is—

1. In a car coupler and buffer, the combination of a series of parallel draw-bars having buffers attached thereto provided with an arm, and a spring to keep the buffer-plates extended, the said draw-bars being pivoted to an angle-arm, and a means for imparting reciprocity of motion to the opposite draw-bar through a rod supported transversely to the long axes of the said cars, all substantially as and for the purpose set forth.

2. In a car coupler and buffer, the combination of an oscillating yoke centrally supported and controlled by springs with an angle-arm pivoted to the timbers of a car, and draw-bar uniting two cars, all substantially as and for the purpose set forth.

3. In a car coupler and buffer, the combination of a yoke centrally supported with the ends held in sockets admitting of oscillation, and an angle-arm connected with the said yoke, and a draw-bar for the purpose of equalizing the tension on the said draw-bars, all substantially as and for the purposes set forth.

CLARENCE Z. HUBBELL.

In presence of—
  CHARLES E. TETLEY,
  H. HAUPT, Jr.